United States Patent Office 3,353,917
Patented Nov. 21, 1967

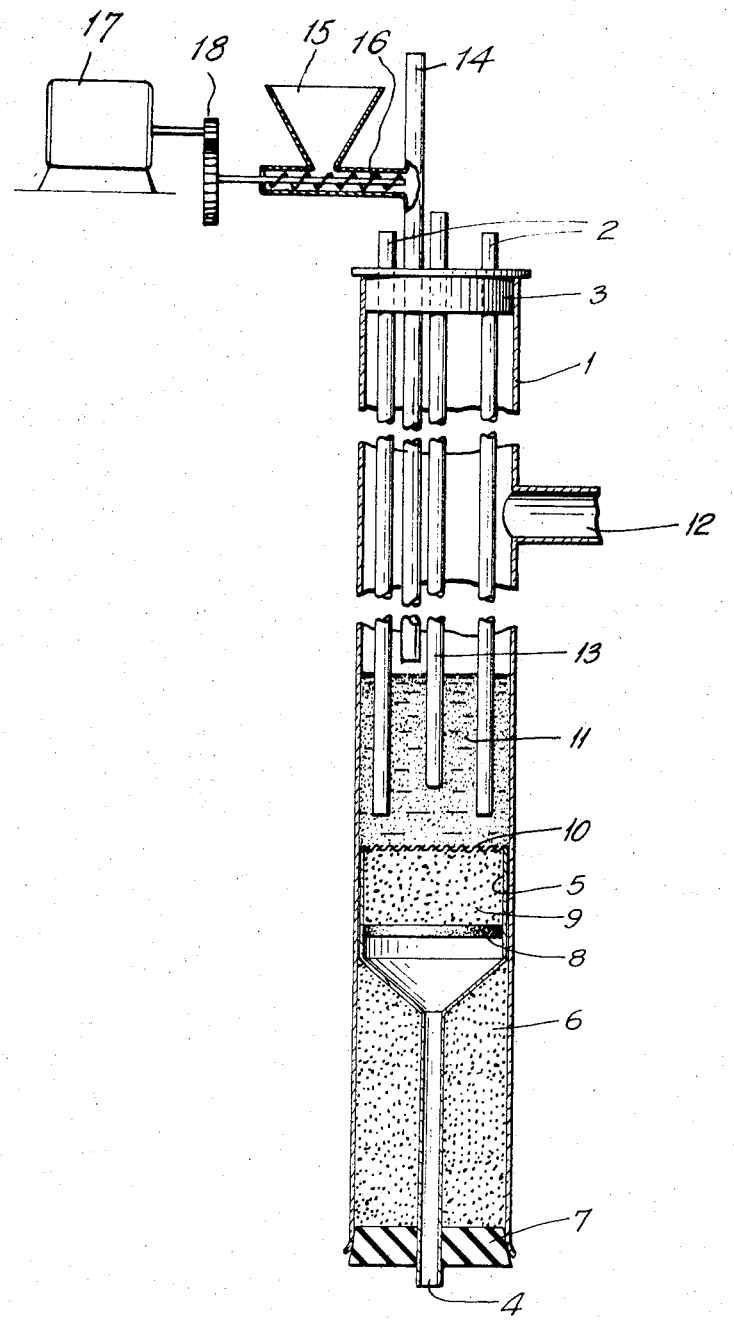

3,353,917
PRODUCTION OF PHOSPHORUS
George Jordan Harris, Beloeil, Quebec, Canada, assignor to Canadian Industries Limited, Montreal, Quebec, Canada, a corporation of Canada
Filed Mar. 4, 1964, Ser. No. 349,424
Claims priority, application Canada, Aug. 3, 1963, 881,692
4 Claims. (Cl. 23—223)

This invention relates to a novel process for the production of elemental phosphorus.

It is known to produce elemental phosphorus by an electric arc process employing a furnace charge of phosphate rock, silica and coke. The phosphorus produced by the reaction is volatilized and a siliceous slag is drawn off from the bottom of the furnace. This process, since it operates by melting large amounts of material, consumes large quantities of electricity and requires a source of cheap electric power.

It is an object of the present invention to provide a novel process for the production of elemental phosphorus. Another object is to provide a process for the production of elemental phosphorus which is more economical than the process above described. Additional objects will appear hereinafter.

The process of this invention comprises heating a mixture of calcium phosphate and silica in a fluidized electrically conductive carbon bed at a temperature of at least 1400° C.

The fluidized electrically conducting carbon bed employed in the process of this invention is of the type known in the art. Thus in United States Patent No. 1,634,480 issued to L. Wickenden and S. A. W. Okell on July 5, 1927, a process for manufacturing decolorizing charcoal by resistive heating of a bed of material is disclosed. In United States Patent No. 2,968,683 issued to Konrad H. Kossmann on January 17, 1961, a process for electrically heating beds of solids particles spouted with gas is described.

The reactor suitable for carrying out the process of this invention comprises a heat resistant vessel to contain the conducting charge of carbon, calcium phosphate and silica, electrodes for conduction of electrical power to the conducting charge, means for introducing an inert gas to the bottom of the charge, means for dispersing said inert gas to fluidize the charge, means for withdrawing the gaseous products of the reaction and means for separating the phosphorus product from the effluent gases.

The accompanying drawing shows an experimental reactor illustrative of the apparatus suitable for the process of this invention. In this drawing, 1 is a siliceous reactor tube carrying graphite electrodes 2 in an insulating heat resistant plug 3, 4 is the inlet for the fluidizing inert gas which leads to the siliceous gas dispersal funnel 5, which is packed in sand 6, retained by the stopper 7. The fluidizing gas passes through a disperser consisting of a porous carbon disc 8, bed of sand 9 and silica cloth 10, into the reaction charge 11 which is maintained in a fluidized state. 12 is the outlet for the gaseous products and 13 is a well for a temperature measuring thermocouple. 14 is the inlet tube for the introduction of the calcium phosphate-silica mixture. The calcium phosphate-silica mixture is contained in the hopper 15 from which it is transferred to the tube 14 by means of the rotating screw conveyor 16 operated by the motor 17 through the gear assembly 18. Nitrogen or other inert gas may be also passed through tube 14.

The production of elemental phosphorus by the process of this invention can be conveniently be carried out by charging a reactor of the type hereinbefore described with petroleum coke of such particle size that 90% by weight passes a 20 mesh Tyler screen but remains on a 200 mesh Tyler screen, maintaining said coke in a fluidized state by passing a stream of nitrogen through it, heating the fluidized carbon bed to a temperature of about 1500° C. by passing an electrical current through it and then adding finely divided silica and phosphate rock to the top of said fluidized bed. The mixture of finely divided silica and phosphate rock is introduced into the reactor through a tube 14 in plug 3. The solids can be carried down the tube by a stream of nitrogen and blown onto the surface of the bed of hot petroleum coke. A temperature of the order of 1500° C. can be obtained in the reactor using a four electrode system with a voltage of 170 volts and a current of from 35 to 40 amperes.

Evolution of yellow phosphorus can be observed approximately 3 to 4 minutes after the beginning of the addition of the silica and phosphate rock. The phosphorus product can be condensed after it has been swept out of the reactor through the outlet by the stream of nitrogen gas.

In the above described experimental reactor the reaction can be continued as long as the petroleum coke bed contains less than about 10% by weight of added solids. At this stage the fluidization of the bed deteriorates and its temperature becomes erratic. It is visualized that in commercial applications of the process means will be provided to withdraw the coke-slag mixture from the base of the fluidized bed where the fluidizing action favors the segregation of the more dense slag-containing mixture.

The carbon employed in the experimental reactor was petroleum coke. However, other types of carbon which are electrically conducting such as metallurgical coke may be used. The operating characteristics of the reactor will be different when different types of carbon are employed.

The silica employed in the experimental reaction was material containing 98% $SiO_2$ but silica of lower or higher purity is also suitable. The function of the silica is to form a slag with the calcium in the calcium phosphate reagent.

The preferred calcium phosphate reagent is the commercially available phosphate rock. However, other calcium phosphates that are fusible with silica would be suitable.

The relative proportions of the silica and calcium phosphate ingredients should be such that the $SiO_2/Ca$ ratio lies between 0.75 and 1.50.

An alternative method of preparing the ingredients is to mix a carbonaceous fluid such as asphalt or fuel oil with calcium phosphate and silica in proportions such that the material after sintering is electrically conducting. The material is then sintered and formed into pellets. Such pellets possess advantages in that transfer of the ingredients is simplified.

The process of this invention is additionally illustrated but not limited by the following example.

*Example*

To a small experimental reactor containing 40 g. of petroleum coke maintained in a fluidized state by the passage of nitrogen gas through the coke bed and heated by passage of an electrical current therethrough, there were added by increments mixtures of finely divided silica and phosphate rock. The extent of phosphorus evolution was determined by analysis of the calcium to phosphorus ratio in the residual bed material and comparing it to the same ratio in the original phosphate rock. The proportion of phosphorus produced under varying conditions of temperature, composition of silica/phosphate rock mixture and rate of addition are shown in the following table.

TABLE

| Experiment | Temperature, °C. | Composition of silica, phosphate rock mixture added | | Rate of addition, g./min. | Total time of addition, minutes | Phosphorus conversion, percent |
|---|---|---|---|---|---|---|
| | | Phosphorus, moles/mole of calcium | Silica, moles/mole of calcium | | | |
| 1 | 1,250–1,480 | 0.52 | 0.11 | 0.09 | 29 | 37.0 |
| 2 | 1,150–1,190 | 0.52 | 0.75 | 0.16 | 52 | 43.5 |
| 3 | 1,270–1,320 | 0.52 | 0.75 | 0.15 | 38 | 57.5 |
| 4 | 1,400–1,500 | 0.52 | 0.75 | 0.18 | 44 | 81.2 |
| 5 | 1,100–1,190 | 0.52 | 1.10 | 0.16 | 36 | 17.0 |
| 4 | 1,200–1,280 | 0.52 | 1.10 | 0.14 | 58 | 58.6 |
| 5 | 1,400–1,460 | 0.52 | 1.10 | 0.17 | 57 | 94.0 |
| 6 | 1,160–1,220 | 0.52 | 1.25 | 0.15 | 52 | 64.2 |
| 7 | 1,300 | 0.52 | 1.25 | 0.14 | 28 | 69.8 |
| 8 | 1,400–1,650 | 0.52 | 1.25 | 0.23 | 30 | 91.6 |
| 9 | 1,150–1,220 | 0.52 | 1.50 | 0.11 | 42 | 69.8 |
| 10 | 1,250–1,300 | 0.52 | 1.50 | 0.18 | 29 | 64.2 |
| 11 | 1,400–1,480 | 0.52 | 1.50 | 0.23 | 34 | 88.7 |

What we claim is:

1. A process for the production of elemental phosphorus which comprises: (1) maintaining a bed of electrically conductive carbon particles in a fluidized state by the passage of an inert gas therethrough, (2) heating the fluidized bed at a temperature in the range of 1400° C.–1600° C. by the passage of an electrical current therethrough, (3) adding to the heated fluidized bed by increments a mixture of calcium phosphate and silica in an amount less than 10% by weight of the fluidized carbon bed, the $SiO_2/Ca$ ratio of the calcium phosphate-silica mixture lying within the range of 0.75 and 1.50, the calcium phosphate, silica and carbon reacting to form elemental phosphorus, (4) sweeping the elemental phosphorus product from the fluidized bed with the inert fluidizing gas, and (5) separating the elemental phosphorus from the inert gas issuing from the fluidized bed.

2. A process for the production of elemental phosphorus as claimed in claim 1 wherein the calcium phosphate is phosphate rock.

3. A process for the production of elemental phosphorus as claimed in claim 1 wherein the inert gas is nitrogen.

4. A process for the production of elemental phosphorus as claimed in claim 1 wherein the carbon is petroleum coke.

References Cited

UNITED STATES PATENTS

| | | | |
|---|---|---|---|
| 2,135,486 | 11/1938 | Almond | 23—223 |
| 2,974,016 | 3/1961 | Horton et al. | 23—223 |
| 3,010,796 | 11/1961 | Alexander et al. | 23—223 |
| 3,026,181 | 3/1962 | Schreiner et al. | 23—223 |
| 3,052,523 | 9/1962 | Loudon et al. | 23—223 |
| 3,056,659 | 10/1962 | Yarze et al. | 23—223 |
| 3,118,734 | 1/1964 | Miles | 23—223 |
| 3,163,496 | 12/1964 | Jahnig et al. | 23—212 |
| 3,254,957 | 6/1966 | Meiers et al. | 23—212 |

MILTON WEISSMAN, *Primary Examiner.*

EDWARD STERN, MAURICE R. BRINDISI, OSCAR R. VERTIZ, *Examiners.*

B. H. LEVENSON, *Assistant Examiner.*